United States Patent [19]

Watanabe et al.

[11] Patent Number: 5,686,715
[45] Date of Patent: Nov. 11, 1997

[54] ADD-ON BAR-CODE READING APPARATUS IN A BAR-CODE READER

[75] Inventors: Mitsuo Watanabe; Hiroaki Kawai, both of Kawasaki, Japan

[73] Assignee: Fujitsu Limited, Kawasaki, Japan

[21] Appl. No.: 540,059

[22] Filed: Oct. 6, 1995

Related U.S. Application Data

[63] Continuation of Ser. No. 240,815, May 11, 1994, abandoned, which is a continuation of Ser. No. 835,563, Feb. 14, 1992, abandoned.

[30] Foreign Application Priority Data

Mar. 4, 1991 [JP] Japan ................................. 3-037624
Mar. 6, 1991 [JP] Japan ................................. 3-039755

[51] Int. Cl.$^6$ ....................................................... G06K 7/00
[52] U.S. Cl. .............................. 235/436; 235/463; 235/494
[58] Field of Search ...................................... 235/436, 437, 235/462, 463, 466, 472, 494

[56] References Cited

U.S. PATENT DOCUMENTS

| | | | |
|---|---|---|---|
| 4,973,829 | 11/1990 | Ishida ................................. | 235/462 |
| 5,128,527 | 7/1992 | Kawai et al. ....................... | 235/462 |
| 5,189,289 | 2/1993 | Watanabe ........................... | 235/437 |
| 5,198,649 | 3/1993 | Brooks ................................ | 235/462 |
| 5,262,625 | 11/1993 | Tom .................................... | 235/462 |
| 5,278,398 | 1/1994 | Pavlidis et al. ................... | 235/462 |

FOREIGN PATENT DOCUMENTS

| | | |
|---|---|---|
| 0 250 778 | 1/1988 | European Pat. Off. . |
| 0 304 146 | 2/1989 | European Pat. Off. . |
| 0 390 162 | 10/1990 | European Pat. Off. . |
| 2 166 574 | 5/1986 | United Kingdom . |

*Primary Examiner*—Donald T. Hajec
*Assistant Examiner*—Karl D. Frech
*Attorney, Agent, or Firm*—Staas & Halsey

[57] ABSTRACT

An add-on bar code reading apparatus used in a bar code reader identifies a block of a main-part bar code by detecting start and end guard-bars, determines a right end of the main-part bar code based upon whether all the characters in the block carry even parity, detects the add-on bar code a predetermined interval after the right end, and reads the add-on bar code thus-detected. The apparatus also determines whether a plurality of sets of add-on characters are read which have differing numbers of characters, compares the plurality of sets of add-on characters character-by-character for equality in character code and in parity, and determines whether the number of characters is equal to that of the set having the smallest number of characters. When a match is determined the set of add-on characters having the largest number of characters for the add-on bar code is selected.

10 Claims, 9 Drawing Sheets

FIG. 2(a)
PRIOR ART

|  | PARITY FOR | |
|---|---|---|
| (10 x X+Y) / 4 | X | Y |
| RESIDUAL 0 | ODD | ODD |
| RESIDUAL 1 | ODD | EVEN |
| RESIDUAL 2 | EVEN | ODD |
| RESIDUAL 3 | EVEN | EVEN |

FIG. 2(b)
PRIOR ART

|  | PARITY FOR | | | | |
|---|---|---|---|---|---|
| $\alpha$ | V | W | X | Y | Z |
| 0 | EVEN | EVEN | ODD | ODD | ODD |
| 1 | EVEN | ODD | EVEN | ODD | ODD |
| 2 | EVEN | ODD | ODD | EVEN | ODD |
| 3 | EVEN | ODD | ODD | ODD | EVEN |
| 4 | ODD | EVEN | EVEN | ODD | ODD |
| 5 | ODD | ODD | EVEN | EVEN | ODD |
| 6 | ODD | ODD | ODD | EVEN | EVEN |
| 7 | ODD | EVEN | ODD | EVEN | ODD |
| 8 | ODD | EVEN | ODD | ODD | EVEN |
| 9 | ODD | ODD | EVEN | ODD | EVEN |

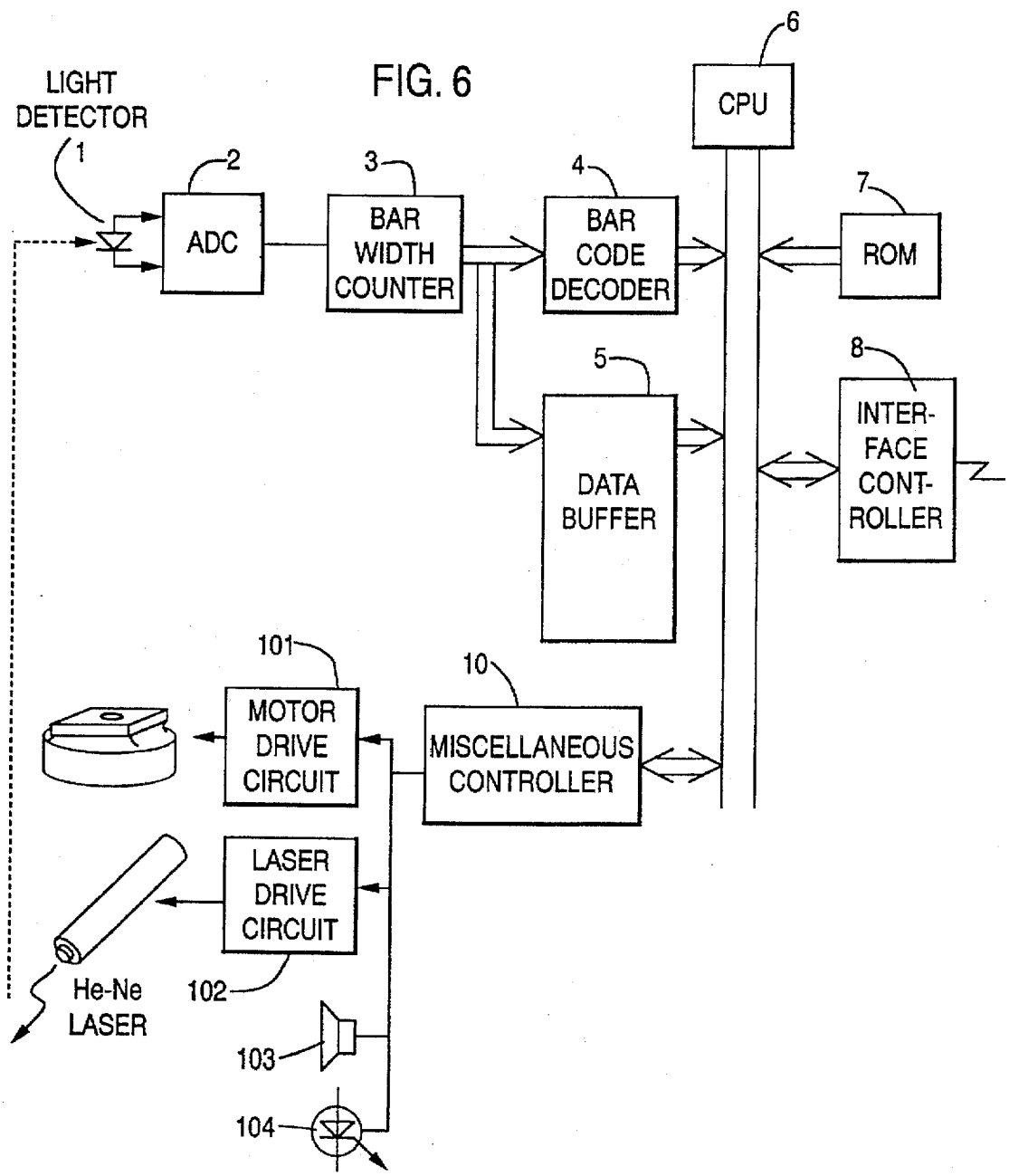

ADD-ON BAR-CODE READING APPARATUS IN A BAR-CODE READER

This application is a continuation of application Ser. No. 08/240,815, filed May 11, 1994, now abandoned, which is a continuation of application Ser. No. 07/835,563, filed Feb. 14, 1992, now abandoned.

BACKGROUND THE INVENTION

1. Field of the Invention

The present invention relates to a bar-code reader. More particularly, the present invention relates to an add-on bar code reading apparatus used in a bar-code reader.

A bar-code reader, which reads product codes of numeric characters represented by a series of adjacent stripes of various widths, is widely used, for example, as a terminal in a point of sale (POS) system. To facilitate the management of sales by increasing information for products recorded on a bar code, a bar code system which has a normal bar code (hereinafter called a main-part bar code) followed by an additional bar code (herein after called an add-on bar code), is being put into practical use.

Accordingly, an add-on bar code reading apparatus used in a bar-code reader, which can read an add-on bar code properly and efficiently, is in great demand.

2. Description of the Related Art

A bar-code reader reads a bar code, usually by irradiating a laser beam onto the bar code, measures the widths of the black and white bars based on the light reflected and converts the bar widths into numeric characters. Conventional bar-code readers are designed mostly for a main-part bar code with little consideration for an add-on bar code. It appears that an established method of fully automatically and economically reading an add-on bar code is not known. Moreover, a conventional bar-code reader has a low reading capacity because it includes incidents called double-label errors (explained later) which occur when there is a failure during bar code reading, as discussed below.

FIG. 1(a) shows a configuration of a bar code having a 2-character add-on bar code. FIG. 2(a) is an odd-even parity configuration table for a 2-character add-on bar code.

As shown in FIG. 1(a), a bar code having an add-on bar code is made of a main part and an add-on part. The format of the main part is stipulated in such code system standards as UPC/A, UPC/E, EAN13, and EAN8. The 2-character add-on part includes a special left guard-bar (SLGB), a first character X, a delineate bar (DB) and a second character Y. The X and Y are numeric characters, each carrying odd-even parity. The parity for X and Y is determined, as shown in FIG. 2(a), by using the residual of a 2-digit decimal number XY divided by 4, where X and Y are the tens and unit digits, respectively.

FIG. 1(b) shows a configuration of a bar code having a 5-character add-on bar code. FIG. 2(b) is an odd-even parity configuration table for a 5-character add-on bar code.

As shown in FIG. 1(b), the 5-character add-on part includes an SLGB and a character followed by 4 pairs of a DB and characters V, W, X, Y and Z. The parity for the five characters is determined, as shown in FIG. 2(b), by using the unit digit α obtained from the following calculation:

$$(V+X+Z) \times 3 + (W+Y) \times 9$$

FIG. 3 shows a laser beam scanning a bar code.

Usually, a fixed-type bar-code reader scans a laser beam on a bar code several times, varying the direction of scanning, e.g., the directions A, B and C as shown in FIG. 3. The bar-code reader reads the bar code for the different directions of scanning, decodes the code read into numeric characters and checks the characters for validity. The decoded add-on part (referred to as add-on characters) is parity-checked based on the parity rule specified by the above-described calculation and the table in FIGS. 2(a) and 2(b). If two or more sets of characters are read for the single add-on bar code because of the different directions of scanning, a double-label error is recognized and the reading is regarded as a failure, even when the characters carry proper parity.

When a laser beam is scanned on a 5-character add-on bar code in the directions C and B, for example, two different sets of 2 and 5 add-on characters are read for that single bar code. Both sets of characters may conform to the above-mentioned parity rule because an add-on bar code has no stop code or similar code. For the direction C, an add-on bar code having characters, e.g., E3, E1, 04, 01 and 07, is read (E and 0 representing even and odd parity, respectively). For the direction B, only the characters E3 and E1 are read. The parity for a remainder 3 obtained by dividing 31 by 4 is an even/even combination according to FIG. 2(a), which agrees with the parity accompanied by the characters E3 and E1. Thus, even when an add-on bar code is correctly read with proper parity, conventional bar-code readers recognize the incident as a double-label error and include it under a failure in bar-code reading, simply because two different sets of add-on characters are read for the single add-on bar code.

As described above, a problem with conventional bar-code readers is that they cannot read an add-on bar code economically or with a high reading capacity.

SUMMARY OF THE INVENTION

It is an object of the present invention to provide a bar-code reader which can automatically read an add-on bar-code properly and economically.

It is another object of the present invention to provide an improved reading capacity bar-code reader which can read an add-on bar-code.

To achieve the above and other objects, the present invention determines a right end of the main-part bar code by detecting a start guard-bar and an end guard-bar, detecting a bar code as an add-on bar code, which occurs a pre-determined interval after the right end, and reads the add-on bar code. The present invention also determines whether a plurality of sets of add-on characters, which sets have a differing number of characters, are read. The plurality of sets of add-on characters are compared with each other, character for character, to determine if the characters are equal (match) When a match occurs, the set of add-on characters having the largest number of characters for the add-on bar code is selected.

BRIEF DESCRIPTION OF THE DRAWINGS

FIG. 2(a) is an odd-even parity configuration table for a 2-character add-on bar code;

FIG. 2(b) is an odd-even parity configuration table for a 5-character add-on bar code;

FIG. 6 is a block diagram of an embodiment according to the present invention;

Throughout the above-mentioned drawings, identical reference numerals are used to designate the same or similar component parts.

DESCRIPTION OF THE PREFERRED EMBODIMENTS

First, a method of the present invention for detecting an add-on bar code is described.

Figure 4A:
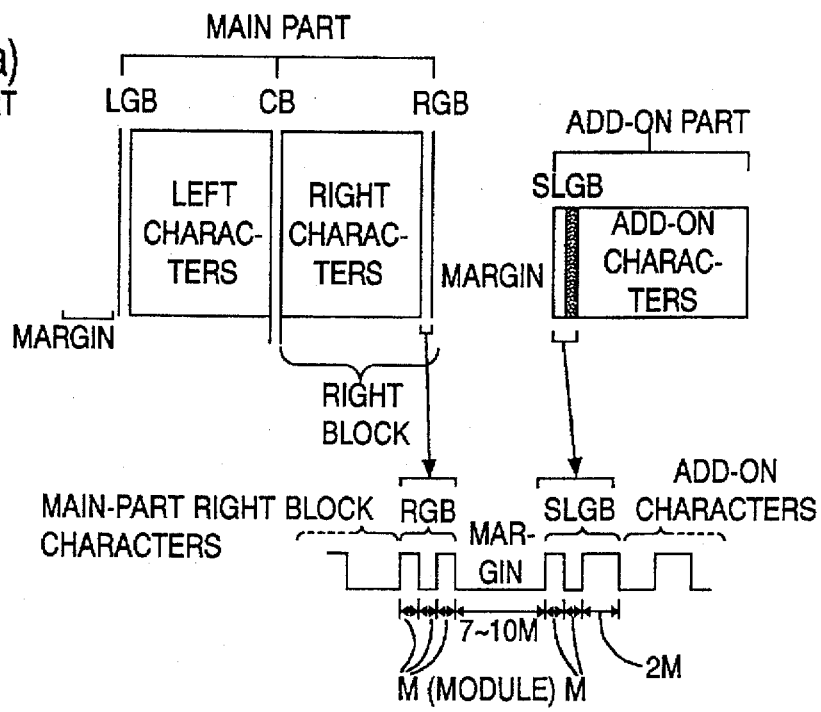
FIG. 4(a) is a configuration of a UPC system bar code having an add-on bar code.

FIG. 4(a) is a diagram of a configuration of a UPC system bar code having an add-on bar code. A main-part bar code includes a first margin, a left guard-bar (LGB), left characters, a center bar (CB), right characters, a right guard-bar (RGB) and a second margin. The add-on part, which begins with a special left guard-bar (SLGB), is recorded with a pre-designated interval (or a predesignated number of modules which are each a unit of least width of the black or white bar) after a right block (main-part right characters and RGB).

Figure 4B:
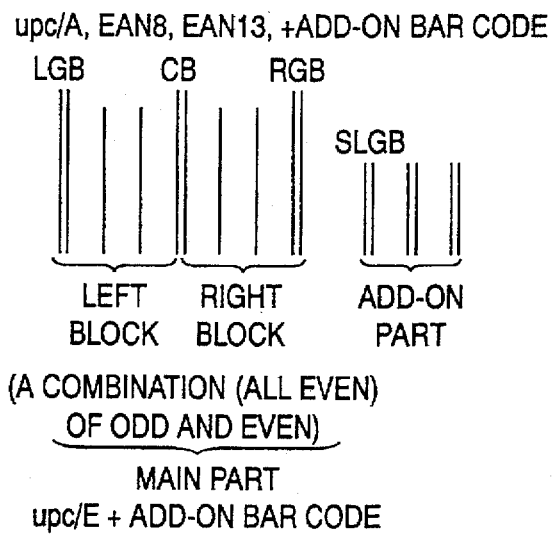
FIG. 4(b) is a configuration of a UPC/A, EAN8 or EAN13 bar code having an add-on bar code.

FIG. 4(b) is a diagram of a configuration of a UPC/A, EAN8 or EAN13 bar code having an add-on bar code.

The bar code includes a first margin, a left block (LGB and left characters), a CB, a right block (right characters and RGB), a second margin and an add-on bar code (SLGB and add-on characters). It is stipulated that the characters in the right block should each carry even parity and those in the left block should carry a combination of even and odd parities.

Figure 4C:
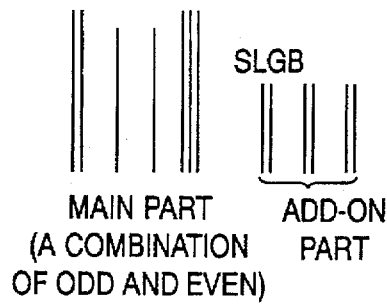
FIG. 4(c) is a configuration of a UPC/E bar code having an add-on bar code.

FIG. 4(c) is a diagram of a configuration of a UPC/E bar code having an add-on bar code.

The main-part of a UPC/E bar code has only a single block. The add-on bar code is recorded a few modules after the rightmost edge of the main part.

Figure 5:
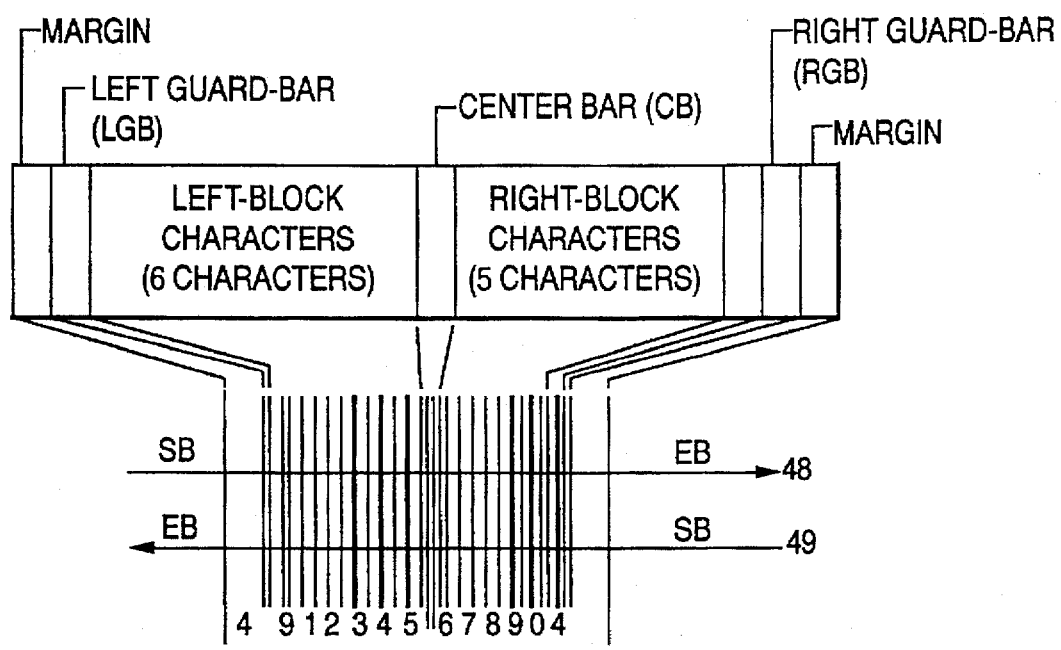
FIG. 5 is a diagram showing a relationship between a bar code configuration and laser beam scanning.

FIG. 5 is a diagram of the relationship between a bar code configuration and a laser beam scanning.

The SB, CB and EB correspond to the LGB, CB and RGB, respectively, when a laser beam is scanned in the direction of the arrow 48, and correspond to RGB, CB and LGB when the laser beam is scanned in the direction of the arrow 49. Thus, whether or not the right block comes first depends on the direction of laser beam scanning.

FIG. 6 is a block diagram of an embodiment according to the present invention.

A laser beam is irradiated from an helium-neon (He—Ne) laser, scanned on a bar code via a polygon mirror and reflected therefrom. A light detector i converts the intensity of the reflected light of the laser beam to an electric signal. An analog-to-digital converter (ADC) 2 receives the analog signal from the light detector i and converts it to a digital signal. A bar-width counter 3 measures the width of white and black bars by counting the number of clocks occurring while the digital signal from the ADC 2 is "1" or "0" corresponding to the bar being black or white. The bar-width counter then outputs (white and black) bar width data based on the measured width of the white and black bars.

Figure 7:
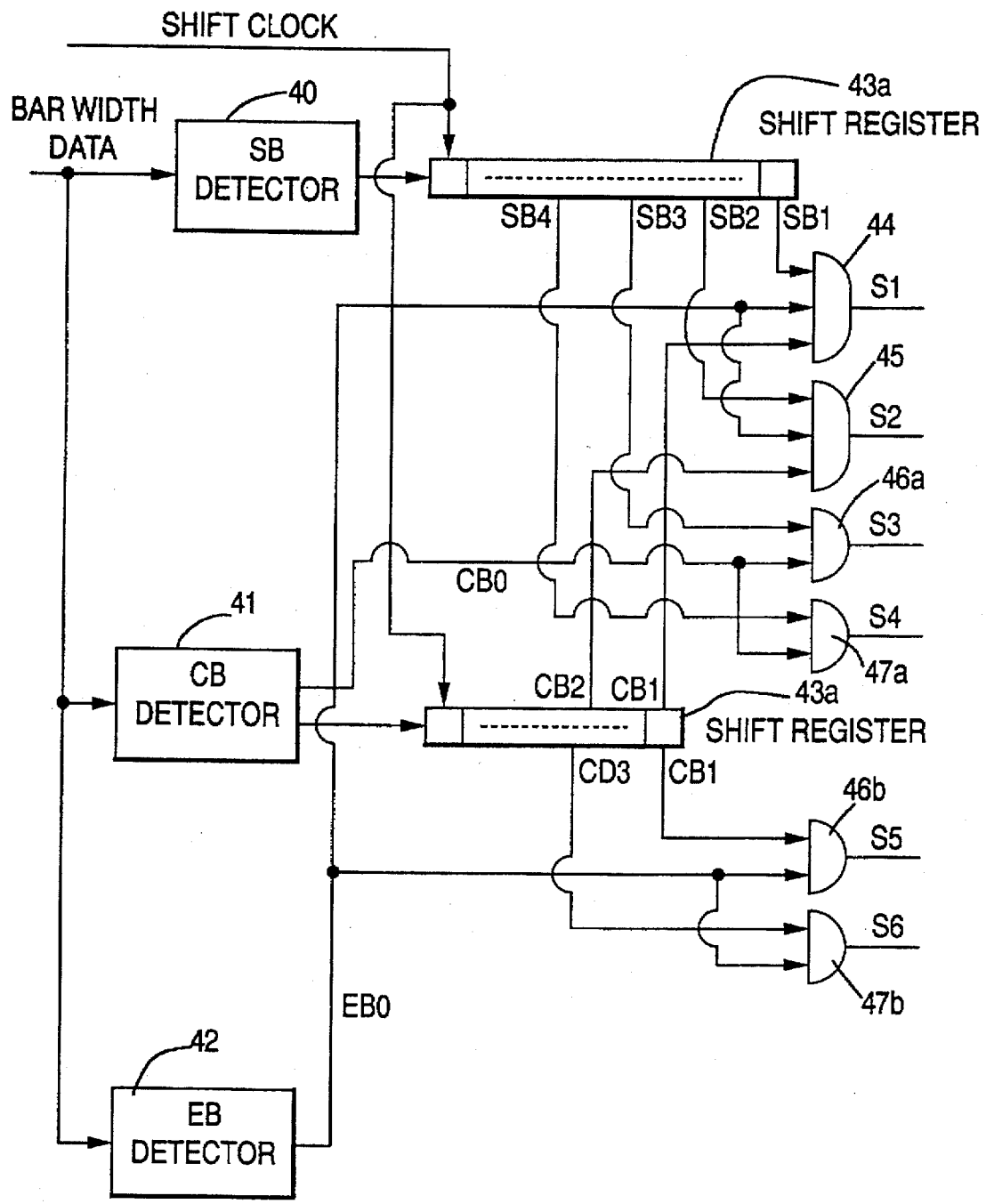
FIG. 7 is a detailed circuit diagram of a part of the bar code decoder 4.

A bar code decoder 4, which comprises circuits as shown in FIG. 7, detects a start guard-bar (called SB), center guard-bar (called CB) and end guard-bar (called EB), generates pointer signals indicating the bar code types such as UPC/A, UPC/E, EAN13, EAN8 and decodes the bar code into numeric characters. A data buffer 5 temporarily stores the characters decoded, which are later sent to, for example, a POS terminal. A micro-processing unit (CPU) 6 performs the processing illustrated in the flowchart in FIGS. 8 and 9, as instructed by the control program stored in a read-only-memory (ROM) 7.

An interface controller 8 controls communication with, for example, a POS terminal, to send the data read from a bar code. A miscellaneous controller 10 controls a laser drive circuit 102 which drives an He—Ne laser, a motor drive circuit 101 which rotates a polygon mirror for scanning a laser beam, a speaker 103 and a display indicator 104.

FIG. 7 is a detailed circuit diagram of a part of the bar code decoder 4. A start guard-bar detector (hereinafter referred to as an SB detector) 40, a center guard-bar detector (hereinafter referred to as a CB detector) 41 and an end guard-bar detector (hereinafter referred to as an EB detector) 42, detect the SB, CB and EB, respectively (see FIG. 5) by decoding the bar width data from the bar width counter 3. The CB shows a symmetry between the left and right halves, irrespective of the direction of laser-beam scanning.

The SB is defined as a guard bar following a margin, and the EB is defined as a guard bar followed by a margin. Therefore, when a laser beam is scanned along the arrow 48, the SB is the left guard-bar (LGB) and the EB is the right guard-bar (RGB). When a laser beam is scanned along the arrow 49, the SB is the right guard-bar (RGB) and the EB is the left guard-bar (LGB). Thus, the SB, CB and EB can be detected by the bar code decoder 4 in FIG. 7 based on bar width data from the bar width counter 3.

A shift register 43a inputs a logical "1" (hereinafter represented as "1") and right-shifts the "1"in synchronization with a shift clock from the time when the SB detector 40 detects the SB data. Similarly, a shift register 34b inputs a "1" and right shifts the "1" from the time when the CB detector 41 detects the CB data.

AND gates 44–47b output pointer signals S1–S6, respectively, by ANDing any of the signals SB1–SB4, CB0–3 and EB0. Signals CB0 and EB0 become active when the CB detector 41 and EB detector 42 detect the CB and EB data, respectively, in the bar width data from the bar width counter 3. Signals SB1–SB4 become active when the "1" input by the SB detector 40 is shifted to respective positions thereof in the shift register 43a. Signals CB1–CB3 become active when the "1" input by the CB detector 41 is shifted to respective positions thereof in the shift register 43b.

The pointer signals S1–S6 are generated as follows:

(1) When the SB data is detected by the SB detector 40, the shift register 43a starts shifting the "1".

(2) when the CB data is detected by the CB detector 41, the shift register 43b starts shifting the "1".

(3) When the CB data is detected, either S4 (an AND of CBO and SB4) or S3 (an AND of CBO and SB3) becomes active depending on which of the signals SB4 and SB3 is active, i.e., how far the "1" is shifted. This indicates whether the main bar code includes 4 or 6 characters respectively, between the SB data and the CB data.

(4) When the EB data is detected by the EB detector 42, either S2 (an AND of EBO, CB2 and SB2) or S1 (an AND of EBO, CB1 and SB1) becomes active depending on whether the main bar code includes 8 or 12 characters, respectively, between the SB data and the EB data. Similarly, either S6 (an AND of EBO and CB3) or S5 (an AND of EBO and CB1) becomes active depending on whether the main bar code includes 4 or 6 characters, respectively, between the CB data and the EB data.

Thus, the pointer signals S1–S6 are generated depending on the UPC-system bar codes (UPC/A, EAN 8-character, EAN 13-character and UPC/E). The present invention uses the pointer signals S1–S6 to detect an add-on bar code following the main-part bar code, as described below.

Figure 10:
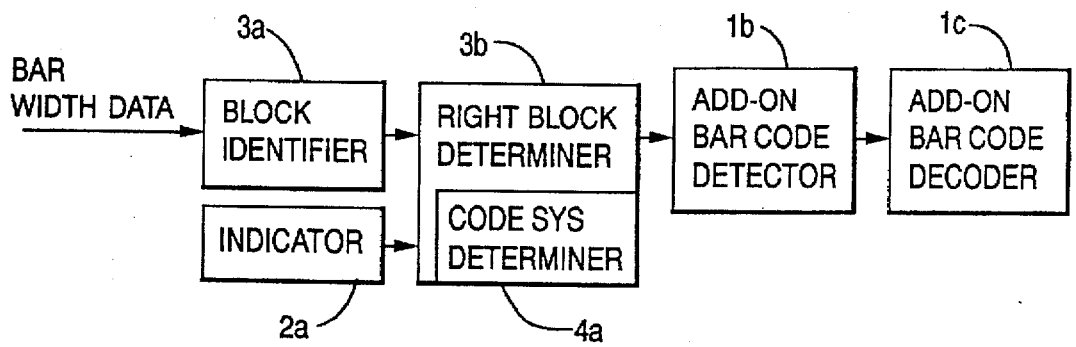
FIG. 10 is a circuit diagram of a portion of the barcode decoder for reading an add-on barcode according to FIG. 8.

FIG. 10 is a circuit diagram of a part of the bar code decoder 4 illustrating a method for reading an add-on bar code. The functional blocks in the figure are program modules performed by the CPU 6, whose functions are described with respect to FIG. 8.

Figure 8:
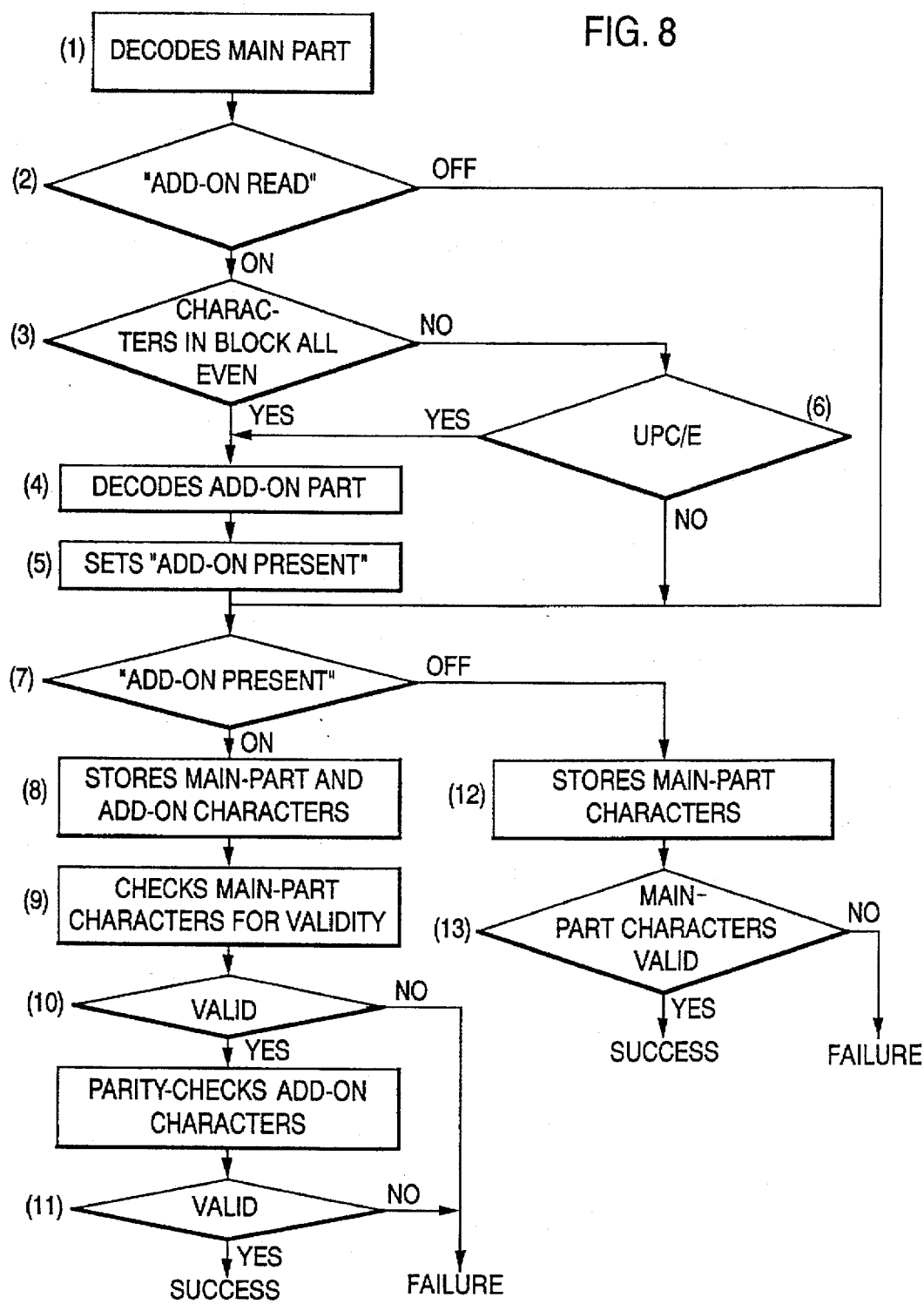
FIG. 8 is a flowchart for an operation to read an add-on bar code according to the embodiment of the present invention.

FIG. 8 is a flowchart for an operation to read an add-on bar code according to the embodiment of the present invention.

In FIG. 8, the bar code decoder 4 decodes the main-part bar code in step (1). The block identifier 3a recognizes a block of the main-part bar code (see FIG. 4(a)) based on the pointer signals S1–S6 and converts the bar code into numeric characters. It is determined, in step (2), whether an "add-on read" flag is on. The flag is set by an operator using a key indicator 2a provided on the bar-code reader, when an add-on bar code is desired to be read. When the flag is not on, the processing goes to step (7) without reading an add-on bar code.

When the flag is on, in step (3), the right block determines 36 whether the block concerned is a right block by checking whether all the characters within the block are even. It is stipulated that all the characters included in the right block should carry even parity. A character is defined to carry even parity when the number of modules forming the black bars within the character is even. The bar code decoder 4 then decodes the add-on bar code in step (4). That is, when the block concerned is a right block (yes) or the UPC/E code system is used (see step (6) below), the add-on bar code detector 16 recognizes a bar code which occurs a predetermined number of modules (7 to 10) after the right block as an add-on bar code, and the add-on barcode decoder 1c decodes the add-on bar code into characters. The bar code decoder 4 then sets an "add-on present" flag in step (5). This means that there is a decoded add-on bar code.

When all the characters in the block are not even (no), the code system determiner 4a determines in step (6), based on the pointer signals S1–S6, whether the code system used is the UPC/E, which has only a single block (without a right block). When the UPC/E code is used (yes), the processing goes to step (4). When the UPC/E code is not used (no), i.e., when the block is a right block, the processing goes to step (7).

Step (7) determines whether the "add-on present" flag is on. If it is on step (8) is implemented. In step (S) when the flag is on (yes), the bar code decoder 4 stores the main-part characters and the add-on characters in the data buffer 5.

Step (9) then checks the main-part characters for validity. When the main-part characters are invalid (no), the reading is a failure as output by step (10). When the main-part characters are valid (yes), the bar code decoder 4 parity-checks the add-on characters as in step (11). When an error is detected (no) in step (11), the reading is a failure. When an error is not detected (yes), the reading is a success.

In step (12), when the "add-on present" flag is not on (no) in step (7), the bar code decoder 4 stores the main-part characters in the data buffer 5. Step (13) checks the main-part characters for validity. When an error is detected (no), the reading is a failure. When an error is not detected (yes), the reading is a success.

As described above, the present invention reads a main-part bar code and detects the right block in the main-part characters. The present invention also detects an add-on bar code a predetermined number of modules after the right block, reads the add-on bar code and checks the add-on characters for validity. Thus, the present invention can read an add-on bar code automatically and properly in the same way as for a normal bar code which does not have an add-on bar code.

Figure 9:
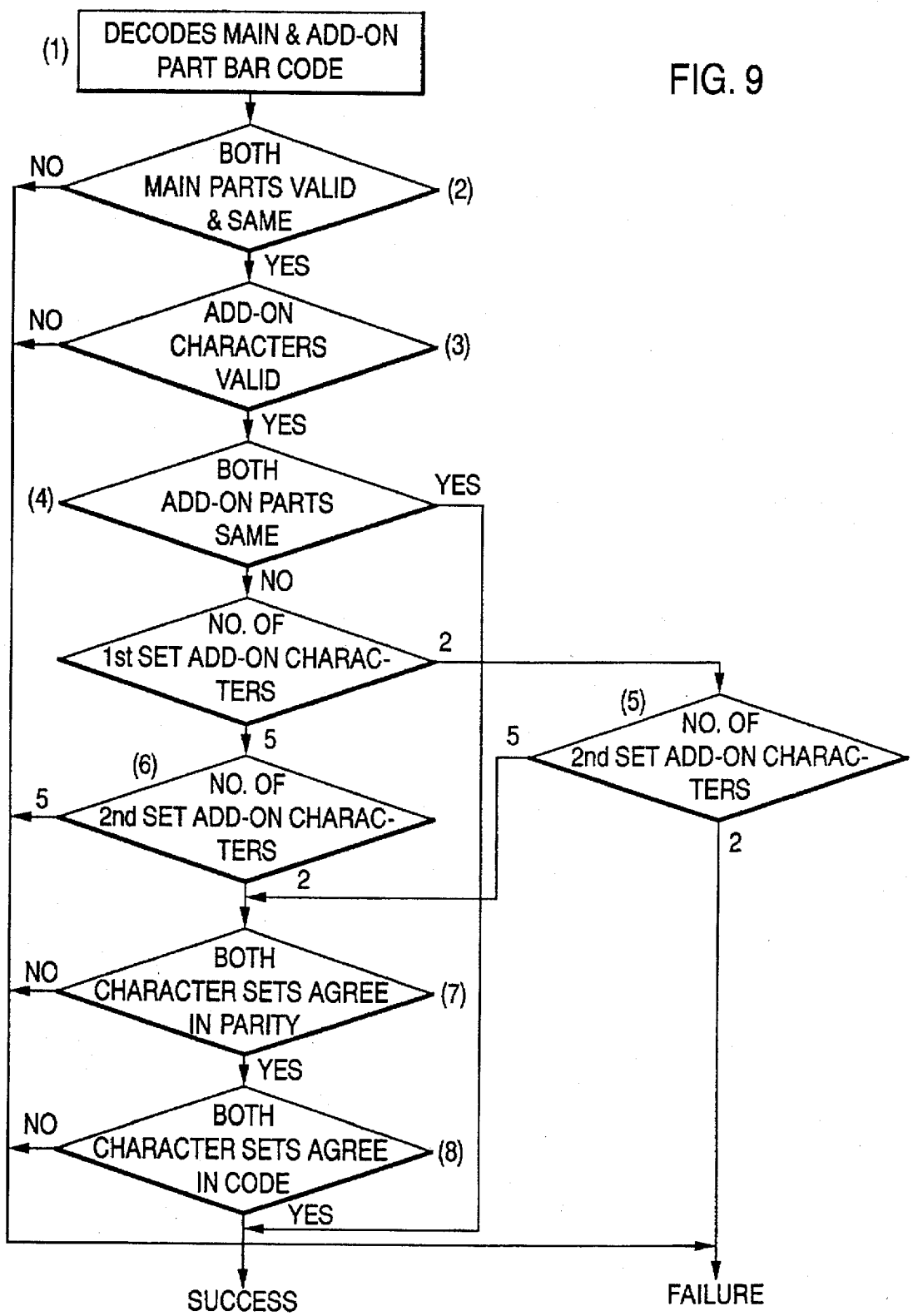
FIG. 9 is a flowchart for an operation to improve reading capacity according to the embodiment of the present invention.
Figure 11:
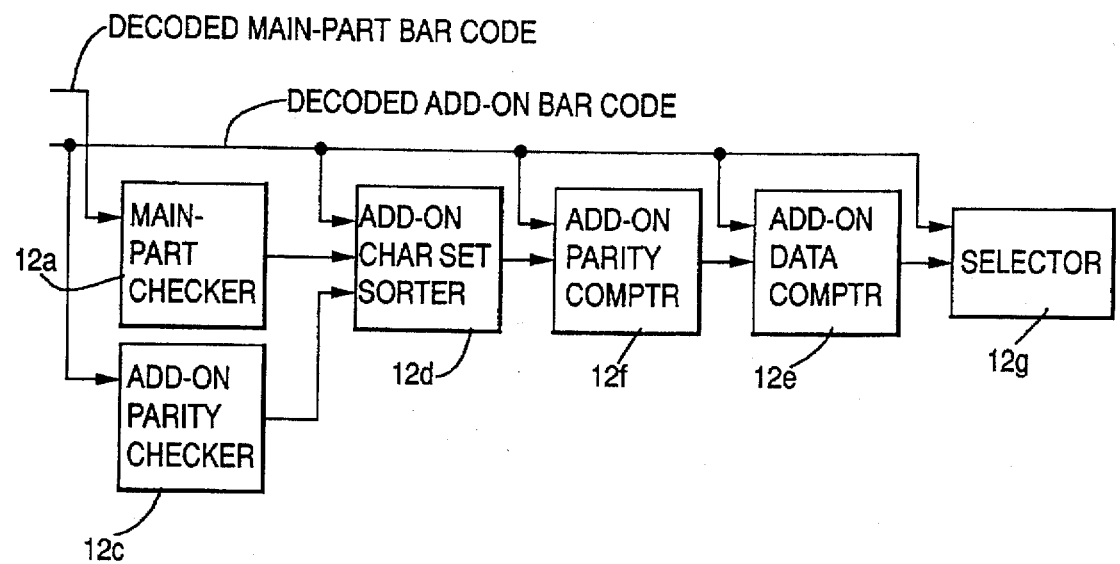
FIG. 11 is a circuit diagram of a portion of the barcode decoder 4 for remedying a double-label error according to FIG. 9.

Second, a method of the present invention to remedy a double-label error occurring in a thus-read add-on bar code is described with respect to FIGS. 9 and 11. FIG. 11 is a circuit diagram of a pad of the bar code decoder 4, illustrating a method for remedying a double-label error. The functional blocks in the figure are program modules performed by the CPU 6, whose functions are described with respect to FIG. 9. FIG. 9 is a flowchart of an operation to remedy a double-label error according to the embodiment of the present invention.

Figure 1A:
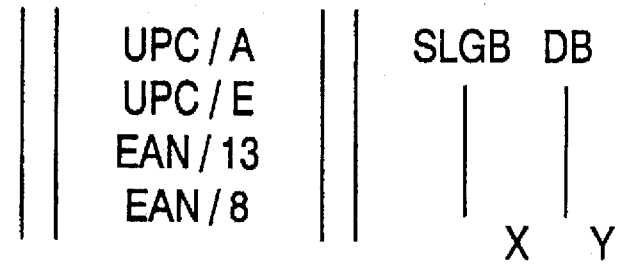
FIG. 1(a) is a configuration of a bar code having a 2-character add-on bar code.
Figure 1B:
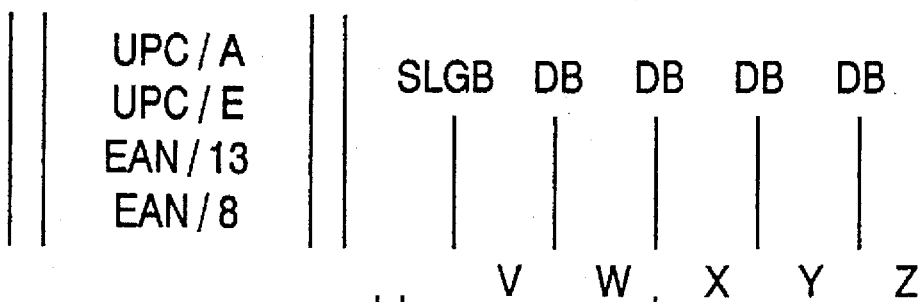
FIG. 1(b) is a configuration of a bar code having a 5-character add-on bar code.
Figure 3:
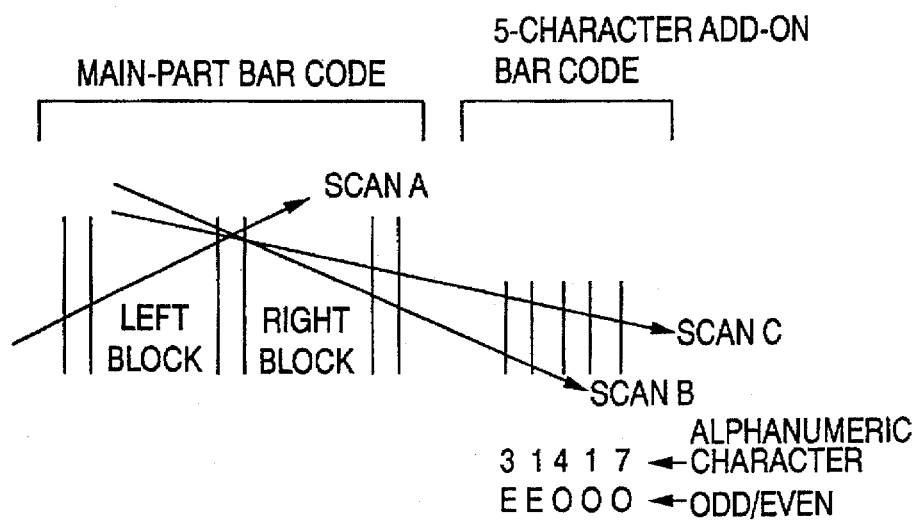
FIG. 3 is laser beam scanning on a bar code.

In step (1) a bar code having an add-on part is scanned with a laser beam, in two directions (C and B in FIG. 3, for example) in a single read operation and is decoded successively into a set of main-part and add-on characters for each scanning. The two (first and second) sets of the main-part and add-on characters are each parity checked. In step (2), the main-part checker 12a checks if both sets of the main-part characters agree with each other or have one each of left and right blocks whose characters carry proper parity. If not, the reading is a failure. In step (3), the add-on parity checker 12c checks if both sets of the add-on characters carry a proper odd-even parity configuration shown in FIGS. 2(a) and 2(b). If not, the reading is a failure. In step (4), the add-on character set counter 12d checks if the add-on characters carry proper parity and agree with each other. If so, the reading is a success. In step (5), the add-on character set counter 12d checks if both (first and second) sets of the add-on characters. each include two characters. If so, the reading is a failure. In step (6), the add-on character counter 12d checks if both sets of the add-on characters each include five characters. If so, the reading is a failure. In step (7), the add-on parity comparator 12f checks if both sets of the add-on characters agree with each other in the odd-even parity configuration for the first two characters, the first set having 2 characters and the second set having 5 characters. If not, the reading is a failure. Additionally, in step (8), the add-on code comparator 12e checks if both sets of the add-on characters agree with each other in character code for the first two characters, the first set having 2 characters and the second set having 5 characters. If not, the reading is a failure. Otherwise, the reading is a success and the set having five add-on characters is accepted as the bar code by the selector 12g.

In the above example, such operations as determining, parity-checking and comparing are performed on decoded characters. However, a proper add-on bar code data can be selected from two or more sets of bar code data having different lengths. This results from laser beam scanning in different directions, by performing such operations on bar width data not yet decoded.

As described above, when a double-label error occurs which is caused by laser beam scanning in different directions and which prior art bar-code readers consider a failure in bar code reading, the present invention compares a plurality of sets of add-on characters read in respect of the odd-even parity configuration and character code for the first several characters. When they agree, it recognizes a bar code including a set of add-on characters having a larger number of characters, thus remedying most of the double-label errors and increasing reading capacity.

The foregoing is considered as illustrative only of the principles of the present invention. Further, since numerous modifications and changes will readily occur to those skilled in the art, it is not desired to limit the invention to the exact construction and applications shown and described. Accordingly, all suitable modifications and equivalents may be resorted, fully within the scope of the invention and the appended claims and their equivalents.

What is claimed is:

1. An add-on bar code reading apparatus used in a bar code reader which reads a bar code including a main-part bar code and an add-on bar code, detects a start guard-bar, a center guard-bar and an end guard-bar of the main-part bar code and decodes the read bar code into characters, said add-on bar code reading apparatus comprising:

block identification means for identifying any block of the main-part bar code, based on the start guard-bar, center guard-bar and end guard-bar;

right block determination means for checking whether characters in a particular block carry predetermined parity and for determining whether the particular block is a right block in dependence upon the checking;

add-on bar code detection means for detecting only the bar code occurring a predetermined number of modules after a right end of the main-part bar code as the add-on bar code and for detecting the other bar codes occurring after the right end as an error; and means for decoding the add-on bar code detected by said add-on bar code detection means.

2. An add-on bar code reading apparatus according to claim 1, wherein said right block determination means comprises code system determination means for determining a code system used and for determining the block identified by said block identification means to be the right block when the code system has only one block.

3. An add-on bar code reading apparatus according to claim 2, wherein said code system determination means comprises:

conversion means for measuring a width of black and white bars read and for converting the width to a bar width signal;

start guard-bar detection means for detecting a start guard-bar based on the bar width signal;

center guard-bar detection means for detecting a center guard-bar based on the bar width signal;

end guard-bar detection means for detecting an end guard-bar based on the bar width signal;

first shift means for inputting an indicator and shifting the indicator from a time when the start guard-bar is detected by said start guard-bar detection means;

second shift means for inputting an indicator and shifting the indicator from a time when the center guard-bar is detected by said center guard-bar detection means; and means for determining a code system used based on the detection by said center guard-bar detection means, said end guard-bar detection means, said first decoder means and said second decoder means.

4. An add-on bar code reading apparatus used in a bar code reader which scans a single bar code a plurality of times, reads a plurality of sets of bar width data over a plurality of scans, decodes the read bar width data into add-on bar width data, checks the plurality of sets of add-on bar width data for validity and selects one set of add-on bar-width data based on the checking, said add-on bar code reading apparatus comprising:

width data check means for checking whether a plurality of sets of add-on bar width data, which sets have differing number of modules, are read;

width data comparison means for comparing said plurality of sets of bar width data for equality in the number of modules equal to a set having the smallest number of modules;

parity comparison means for comparing said plurality of sets of bar width data for equality of parity in the number of modules equal to that of a set having the smallest number of modules; and means for selecting one of said plurality of sets of bar width data having the largest number of modules for the add-on bar width data when the plurality of sets of bar width data have differing numbers of modules and the bar-width data thereof is equal, based upon the checking and comparison by said width data check means and said width data comparison means, respectively, said bar width data comprising black-data and white-data modules, and said checking being conducted based on units of said black-data and white-data modules comprising a character.

5. An add-on bar code reading apparatus used in a bar code reader which scans a single bar code a plurality of times, reads a plurality of sets of add-on characters over a plurality of scans, decodes the read bar code into add-on characters, checks the plurality of sets of add-on characters for validity and selects one of the sets of add-on characters based upon the checking, said bar code reading apparatus comprising:

check means for checking whether a plurality of sets of characters, which sets have differing numbers of characters, are read;

first comparison means for comparing said plurality of sets of characters for equality in character code, character for character, in the number of characters equal to that of a set having the smallest number of characters; and means for selecting one of said plurality of sets of characters having the largest number of characters for the add-on bar code when the plurality of sets of characters have differing numbers of characters and are equal in character code, based upon the checking and comparison by said check means and said first comparison means, respectively.

6. An add-on bar code reading apparatus used in a bar code reader which scans a single bar code a plurality of times, reads a plurality of sets of characters over the plurality of scans, decodes the read bar code into add-on characters, checks the plurality of sets of add-on characters read for validity and selects one set of add-on characters based upon the checking, said bar code reading apparatus comprising:

check means for checking whether a plurality of sets of characters, which sets have differing numbers of characters, are read;

second comparison means for comparing said plurality of sets of characters for equality of parity, character for character, in the number of characters equal to that of a set having the smallest number of characters; and means for selecting one of said plurality of sets of characters having the largest number of characters for the add-on bar code when the plurality of sets of characters have a differing number of characters and are equal in parity, based upon the checking and comparison by said check means and said second comparison means, respectively.

7. An add-on bar code reading apparatus including a bar code having a main-part bar code and an add-on bar code, scanning a single bar code a plurality of times, reading a plurality of sets of characters over the plurality of scans, decoding the read bar code into a plurality of add-on characters, checking a plurality of the add-on characters for validity and selecting one set of add-on characters based on the checking, said add-on bar code reading apparatus comprising:

first main-part check means for parity-checking a plurality of sets of main-part characters;

second main-part check means for checking whether the plurality of sets of main-part characters, are the same;

first add-on check means for checking the plurality of sets of add-on characters for conformity to a predetermined parity rule;

second add-on check means for checking whether a plurality of sets of add-on characters, which have differing numbers of characters, are read;

first add-on comparison means for comparing said plurality of sets of add-on characters for equality in character code, character for character, in the number of characters equal to one of said plurality of sets of add-on characters having the smallest number of characters; and second add-on comparison means for comparing said plurality of sets of add-on characters for equality in parity, character for character, with the number of characters equal to one of said plurality of sets of add-on characters having the smallest number of characters; and means for selecting said one of said sets of add-on characters having the largest number of characters for the add-on bar code when the plurality of sets of main-part characters have proper parity and are the same, the plurality of sets of add-on characters conform to the rule, have differing number of characters and are equal in character code and parity, based upon the checking by said first main-part check means, said second main-part check means, said first add-on check means and said second add-on check means, and upon comparison by said first add-on comparison means and said second add-on comparison means.

8. An add-on bar code reading apparatus used in a bar code reader which reads a bar code including a main-part bar code and an add-on bar code, detects a start guard-bar, a center guard-bar and an end guard-bar of the main-part bar code and decodes the read bar code into characters, said add-on bar code reading apparatus comprising:

block identification means for identifying any block of the main-part bar code, based on the start guard-bar, center guard-bar and end guard-bar;

right block determination means for checking whether characters in a particular block carry predetermined parity and for determining whether the particular block is a right block in dependence upon the checking;

add-on bar code detection means for detecting only the bar code occurring a predetermined number of modules after a right end of the main-part bar code as the add-on bar code and for detecting the other bar codes occurring after the right end as an error;

means for decoding the add-on bar code detected by said add-on bar code detection means; and indication means for selectively indicating said add-on bar code reading apparatus to read the add-on bar code.

9. An add-on bar code reading apparatus according to claim 8, wherein said right block determination means comprises code system determination means for determining a code system used and for determining the block identified by said block identification means to be the right block when the code system has only one block.

10. An add-on bar code reading apparatus according to claim 9, wherein said code system determination means comprises:

conversion means for measuring a width of black and white bars read and for converting the width to a bar width signal;

start guard-bar detection means for detecting a start guard-bar based on the bar width signal;

center guard-bar detection means for detecting a center guard-bar based on the bar width signal;

end guard-bar detection means for detecting an end guard-bar based on the bar width signal;

first shift means for inputting an indicator and shifting the indicator from a time when the start guard-bar is detected by said start guard-bar detection means;

second shift means for inputting an indicator and shifting the indicator from a time when the center guard-bar is detected by said center guard-bar detection means; and means for determining a code system used based on the detection by said center guard-bar detection means, said end guard-bar detection means, said first decoder means and said second decoder means.

* * * * *

UNITED STATES PATENT AND TRADEMARK OFFICE
CERTIFICATE OF CORRECTION

PATENT NO. : 5,686,715
DATED : Nov. 11, 1997
INVENTOR(S) : WATANABE et al.

It is certified that error appears in the above-identified patent and that said Letters Patent is hereby corrected as shown below:

Col. 1, line 62, change "$\alpha$obtained" to --$\alpha$ obtained--.

Col. 4, line 1, change "detector i" to --detector 1--;
line 4, change "detector i" to --detector 1--.

Col. 5, line 40, after "right block" insert --determiner 3b--;
line 41, delete "36";
line 50, change "detector 16" to --detector 1b--;
line 65, change "step (S)" to --step (8)--.

Col. 6, line 26, change "pad" to --part--;
line 50, after "characters" (first occurrence) delete ".".

Signed and Sealed this

Third Day of March, 1998

*Attest:*

BRUCE LEHMAN

*Attesting Officer*     Commissioner of Patents and Trademarks